United States Patent [19]

Foulkes et al.

[11] 4,161,503

[45] Jul. 17, 1979

[54] METHOD OF MAKING MULTITUBULAR SHEATHS

[75] Inventors: Stanley C. Foulkes, Deane; Robert Moore, Whitfield; James Ratcliffe, Bolton; James M. Stephenson, Urmston, all of England

[73] Assignee: Chloride Group Limited, London, England

[21] Appl. No.: 774,201

[22] Filed: Mar. 3, 1977

[30] Foreign Application Priority Data

Mar. 4, 1976 [GB] United Kingdom ............... 8762/76
Aug. 20, 1976 [GB] United Kingdom ............. 34902/76

[51] Int. Cl.² ............................................. B29G 5/00
[52] U.S. Cl. ................................. 264/136; 264/137; 264/257; 264/280; 264/322; 264/324
[58] Field of Search ............... 264/134, 136, 137, 280, 264/322, 324, 257; 429/140, 141

[56] References Cited

U.S. PATENT DOCUMENTS

| | | | |
|---|---|---|---|
| 2,418,974 | 4/1947 | Henry | 264/136 |
| 2,896,006 | 7/1959 | Sundberg | 429/140 |
| 3,234,309 | 2/1966 | Graff | 264/137 X |
| 3,565,983 | 2/1971 | Eigenmann | 264/137 |
| 3,725,130 | 4/1973 | Andersson | 136/63 |
| 4,042,436 | 8/1977 | Sundberg | 429/141 |

FOREIGN PATENT DOCUMENTS

| | | | |
|---|---|---|---|
| 2515556 | 10/1975 | Fed. Rep. of Germany | 429/140 |
| 1071917 | 6/1967 | United Kingdom. | |
| 1076102 | 7/1967 | United Kingdom | 264/173 |

*Primary Examiner*—James H. Derrington
*Attorney, Agent, or Firm*—Oblon, Fisher, Spivak, McClelland & Maier

[57] ABSTRACT

A method of making a multitubular sheath comprising providing a porous multitubular fabric impregnated with thermoplastic or deformable polymer, continuously feeding the fabric onto an array of parallel metal rods, one tube to each rod, the rods having straight sizing portions, while holding the rods in a fixed position, the rods having substantially the same cross sectional area over the whole of their length, the fabric at least immediately prior to the sizing portions being substantially at ambient temperature, heating the fabric on the sizing portions so as to permit the fabric to conform to the rod, thereafter cooling the fabric on the rods to solidify or the deformable composite material to set to shape and the tubes to become self supporting, feeding the fabric off the ends of the rods and cutting it to the required length.

6 Claims, 6 Drawing Figures

METHOD OF MAKING MULTITUBULAR SHEATHS

BACKGROUND OF THE INVENTION

1. Field of the Invention

The present invention relates to novel multitubular sheaths particularly useful for electric storage batteries and to novel methods for making such sheaths.

2. Description of the Prior Art

While for convenience the invention will be described with reference to multitubular sheaths for electric storage batteries and is particularly suited thereto, it is not necessarily limited to such applications and could for example be used in the production of multitubular fabric filters for liquids or gases.

It has been proposed in British Pat. No. 1,053,747 to make single tube sheaths for electric storage batteries by impregnating a single porous glass fibre tube in flattened form with a thermosettable resin, namely a solution of phenolformaldehyde resin in ethanol, drawing the wet tube onto a rod having an entry end in the form of a shepherds crook, that is having a curved end extending around about 180°, and then extending for a short length out away from the shaft at 90° thereto.

The flattened tube is thus opened out to tubular form and in this form is heated to cure and set the liquid resin. It is then drawn off the rods and cooled and cut to shape.

We have attempted to apply this process to the production of multitubular sheaths on a continuous basis. However, we have found that this cannot be done satisfactorily.

Thus when a sheath having more than one tube is being formed, and especially one having five or more tubes, the fabric has to bunch together in order to go onto the ends of the rods. This results in frequent jamming with the shepherds crook form of rods and build up of resin deposits on the rods also increases the frequency with which the fabric jams on the rods.

We have found however that by varying the shapes of the rods and also by changing the resin and the heating and cooling sequence, these problems can be substantially reduced.

The invention moreover extends in its broadest aspects to a novel multitubular sheath. The term multitubular is defined for the purposes of this specification as meaning a sheath having at least five tubes arranged side by side.

Thus according to this aspect of the invention, a multitubular sheath comprises a porous fabric defining tubes lying parallel to each other and desireably spaced by a web of fabric having a width less than the diameter of the tubes and preferably less than 20% of the diameter of the tubes, impregnated with a polymer composition such that the impregnated material has an air permeability of 0.5 to 20 liters of air/min./sq. cm./cm. head of water, the melting point of the thermoplastic polymer being at least 20° C. below the temperature at which the material of the fabric melts or chars or the composite material being deformable at a temperature, the deformation temperature, at least 20° C. below the temperature at which the material of the fabric melts or chars.

In a preferred form of the invention a multitubular sheath comprises a porous fabric defining tubes lying parallel to each other, the fabric being composed of at least 50% and desirably 80% to 100% of heat shrinkable fibres, which either have been preshrunk or are shrunk in the fabric, the fabric being impregnated with polyacrylic polymer composition, the fabric being rendered substantially entirely resistant to shrinkage prior to introduction onto the rods.

The polyacrylic polymer composition is preferably a true thermoplastic material and preferably comprises a polymethylmethacrylate. The polyacrylic material, when cast as a thin void free film by evaporation at a temperature above 40° C., preferably has a tensile strength on the tensile test of DIN 53455 of 30 to 40 e.g. 35 N/mm² at a pulling speed of 100 mm per minute, and an elongation at break $\epsilon R$ of 2% to 6%, preferably about 4%.

The material on the torsion pendulum test of DIN 53455 preferably has a T∆ maximum at a frequency of 1 hour of about +55° C. to +60° C. e.g. +58° C.

The material is preferably further characterized by having a density of 1.0 to 1.1, e.g. 1.06 grams/cc. Desirably it has an actual viscosity at 20% (Brookfield viscometer#6) of 500 to 4000 mPAS.

The average particle size as a 50% aqueous suspension is preferably 0.15 micromicrons. The suspension preferably has a PH of 7±0.2 and the minimum film forming temperature is preferably about 40° C.

The fabric is preferably made entirely of polyester fibres and is preferably non woven and may be made of 1 to 4 or 2 to 3 inch long fibres having a denier of 1 to 5, e.g. 2 to 4. The fabric before impregnation may have a heat shrinkability in excess of 10% especially 11% to 20% or 40%.

The heat shrinkability of a fabric is defined herein as the average of the % shrinkage of a sample along the machine length and across the machine length of the fabric when a flat square sample is rested on a flat surface and brought to a temperature of 195° C.

The fabric is preferably made from synthetic organic polymer materials and is preferably a polyester or polyamide material. It may be woven, knitted or non woven. The web between adjacent tubes, when present, may be made of two layers of fabric as when the tubes are made by attaching two layers of fabric to each other along spaced apart lines preferably by stitching or may be a single layer as when the web is produced as an integral stage of knitting or weaving the fabric. In one form of the invention the polymer is preferably a thermoplastic polymer highly resistant to attack by battery environments especially lead acid environments. Preferred polymers are thermoplastic phenol formaldehyde resins (NOVOLAKS), or polyesters or polyacrylic resins, e.g. polymethylmethacrylates.

The polymer compositions used are desirably also elastomeric, namely having elongations at break as void free samples of at least 20% so that the impregnated polymer in the fabric maintains its integrity during the processes used to form the tubes and can accommodate changes in active material volume in the battery during use.

Thus, while plasticized rigid polymers can be used, polymers which have an intrinsic degree of elasticitiy are preferred.

In another form of the invention, the web is selected to be made of thermoplastic fibres and the impregnating resin is a thermosetting resin which is used in an amount such that the impregnated web or composite material is still heat deformable.

The sheaths preferably contain 15% to 35% by weight of impregnated polymer based on the dry weight of the unimpregnated fabric per unit area.

The invention also extends to methods of making such multitubular sheaths.

Thus according to this aspect of the invention, a method of making a multitubular sheath comprises providing a porous multitubular fabric in collapsed form impregnated with 15 to 35%, e.g. 5 to 20% by weight of polymer, the polymer of the composite either being a thermoplastic polymer having a melting point at least 20° C. below the temperature at which the material of the fabric melts or chars, or the composite material being deformable at a temperature, the deformation temperature, at least 20° C. below the temperature at which the material of the fabric melts or chars, and continuously feeding each tube simultaneously onto an array of parallel metal rods having straight sizing portions while holding the rod in a fixed position, the fabric at least immediately prior to the sizing portion being substantially at ambient temperature, and heating the fabric on the sizing portions so as to permit the fabric to conform to the rod and thereafter cooling the fabric on the rods to a temperature such as to permit the thermoplastic resin, if used, to solidify or the deformable composite material to set to shape and the tubes to become self supporting and feeding the fabric off the ends of the rods and cutting it to the required length.

When a thermoplastic polymer is used the heating is preferably carried out at a temperature in excess of the melting point of the thermoplastic polymer but below the melting or charring temperature of the material for a time sufficient to melt the thermoplastic polymer.

The cooling is preferably carried out at a temperature at least 10° C. below the melting point of the thermoplastic resin, or the deformation temperature of the deformable composite material, thus an ambient air stream (15° C.) is effective for a resin melting at 80° C.

In a preferred form of the invention we assist the continuous feeding of the fabric onto the rods by locating a floating mandrel in each tube, this being a short rod, i.e. shorter than the main rod and preferably about 10% to 50% of the length of the main rod, which abuts against the inlet end of the main rod.

The continuous feeding of the fabric onto the rods can also be assisted by heating the fabric before it passes onto the floating mandrels and then allowing or causing the fabric to cool as it passes over the floating mandrels and onto the rods. The temperature of the fabric thus drops to ambient temperature or thereabouts before it reaches the inlet end of the main rod.

The floating mandrel preferably has a diameter or a cross section less than that of the sizing portion of the rod, preferably in the range 80% to 95% of that of the main rod.

The cross section of the rod need not necessarily be circular though this is preferred.

The invention also extends to apparatus for carrying out the aforementioned method.

Thus according to this aspect of the invention, an apparatus for making multitubular sheaths comprises an array of rods, each having a sizing portion of a diameter or cross section corresponding to the internal diameter or cross section desired for the tubes, and an inlet portion of smaller diameter or cross section than the sizing portion, but having a cross sectional area of at least 80% of that of the sizing portion and positioning means for holding the rods in fixed parallel spaced apart relationship in a single plane, the rod positioning means permitting the fabric to be drawn over the rods which are spaced apart by a distance corresponding to the distance between the tubes, driving means for gripping the fabric between the tubes and drawing it over the rods and heating means juxtaposed to the sizing portions of the rods and adjacent to, but spaced from, the inlet portions and cooling means, juxtaposed to the sizing portions of the rods and adjacent to the outlet end of the rods remote from the inlet portions and spaced from the heating means.

The rod positioning means preferably comprises at least two pairs of rollers, each pair of rollers having pairs of opposed grooves in which the rods can rest, one pair of grooves for each rod, the dimensions of the grooves being such as to permit the fabric to be drawn through the grooves over the rods located therein.

The rods preferably have their inlet ends bent so as to form a hook of a walking stick type of shape which engages one of the rollers of the pair of rollers at the inlet end so as to prevent the rods being drawn through the system or causing the system to jam. The inlet ends of the rods are preferably bent through at least 90° but less than 180° and preferably less than 120° and more preferably through 90° only and then extend out away from the roller tangentially thereto.

The ratio of the length of the bent portion to the length of the sizing portion of the rod is desirably in the range 1:3 to 1:10, e.g. 1:5. The ratio of the length of the straight inlet portion to the length of the bent portion is preferably in the ratio 0.1:1 to 0.9:1, e.g. 0.4:1 to 0.7:1.

The driving means are preferably part of the rod positioning means though if desired they may be formed separately. Thus the driving means preferably comprise at least one of a pair of roughened, e.g. knurled, opposed wheel surfaces positioned to grip the fabric between at least one and preferably each pair of rods so that on rotation of the wheel surfaces the fabric will be drawn over the rods without the wheel surfaces cutting the fabric.

The knurled wheel surfaces are preferably provided by at least one, desirably the rear, pair of rod positioning rollers and desirably all the rollers, and are located between each groove of the rollers. The rear pair of rod positioning rollers may be located between the heating means and the cooling means or in the vicinity of the cooling means or more preferably downstream thereof.

The heating means and the cooling means preferably comprise shrouds located close to and on either face of the fabric and supplied with a forced air supply which is heated in the case of the heating means.

It will be appreciated that the invention extends not only to the combination of the machine and the rods but also to the rods on their own and to the machine on its own without the rods.

The rods preferably have a friction reducing and abrasion resistant surface coating at least on their inlet portions. Thus the inlet portions may be metal, e.g. chromium, plated. The floating mandrels may be similarly treated.

We have found that if the fabric is heated before it is brought around the bend of the rods the tubes after they leave the rods tend to bow. We have found that this tendency can be reduced if the material is heated while it goes around the bend and if it is heated on at least part of the straight portion, however, distortion of the fibres is still liable to have occured on going around the bend and joining of the fabric on the rods is still liable to occur.

We have found that these problems can be substantially eliminated by operating in accordance with the invention; thus when the fabric is kept cold while passing around the bend, the resin holds the fibres in position and heating solely on the straight portion produces much better operation of the machine.

When a thermoplastic polymer is used it is desirable to heat the fabric sufficiently to cause the resin to flow, e.g. for a resin of melting point 80° C. a temperature of 110° C. to 120° C. is most satisfactory.

We prefer, however, to apply the drive to the fabric at regions where the fabric is cold or is not being heated, e.g. before the heating stage or after or during the cooling stage.

BRIEF DESCRIPTION OF THE DRAWINGS

Various other objects, features and attendant advantages of the present invention will be more fully appreciated as the same becomes better understood from the following description when considered in connection with the accompanying drawings where like reference characters designate like or corresponding parts through the several views and wherein.

DETAILED DESCRIPTION OF THE PREFERRED EMBODIMENTS

The continuous multitubular sheath forming machine shown in the drawings is adapted to produce sheaths with a range of numbers of tubes but will be described with reference to a fifteen tube sheath.

The machine consists of a sheath supply roller 10 from which a fifteen tube continuous length of sheath 9 is drawn off under the bar 11 up vertically to the inlet rollers 12 and 13, as it reaches the roller 12 it is threaded over the ends of walking stick shaped forming rods 15 (shown in detail in FIGS. 3–5) it then passes between the rollers 12 and 13 with one rod 15 in each of the fifteen tubes. It then immediately passes between upper and lower hot air supplying shrouds 17 and 18 supplied with hot air from a pressure chamber 20 in which heated air is produced by a fan 21 and heating elements 22. The heated sheath still on the rods then passes between upper and lower rear drive rollers 25 and 26 and then between upper and lower cooling shrouds 28 and 29 supplied with air at ambient temperature by a fan 30.

Figure 1:
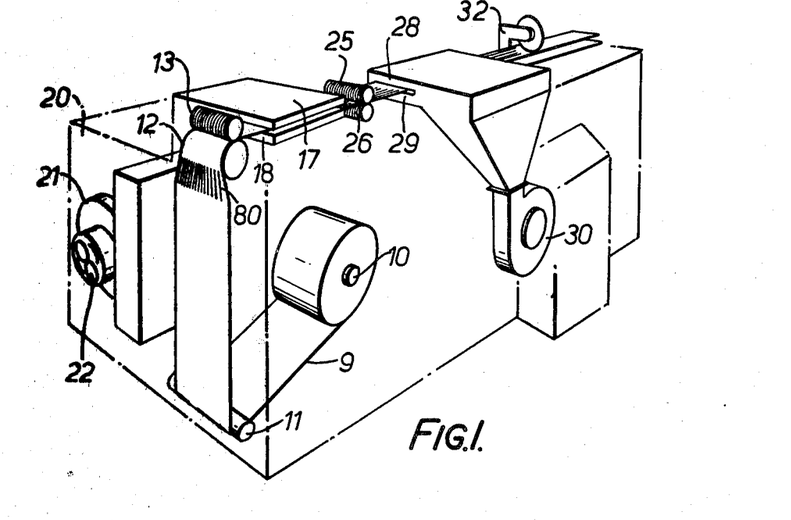
FIG. 1 is a diagrammatic perspective view from the forming end of one embodiment of the machine.

The fabric which has now been set to shape then passes off the ends of the rods 15 and past a reciprocating circular saw 32 and is cut to the desired individual sheath lengths which fall into a collecting bin (not shown).

Figure 2:
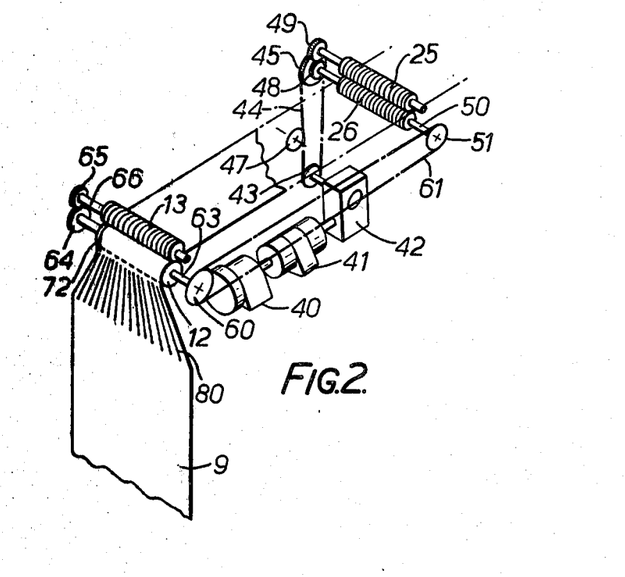
FIG. 2 is a diagrammatic isometric layout of the drive mechanism of the machine shown in FIG. 1.

The drive mechanism is shown in FIG. 2. This consists of a DC motor 40 connected via a clutch and brake unit 41 through a worm reduction unit 42 to a drive wheel 43 and drives by a chain 44 and sprocket mechanism, a large diameter drive wheel 45. The chain is acted on by a tensioner wheel 47. The wheel 45 is attached to a smaller cog wheel 48 attached to a shaft 50 to which the rear lower drive roller 26 is keyed. The other end of the shaft carries a sprocket wheel 51. The cog 48 engages another cog 49 attached to a shaft 52 on which is keyed the rear upper drive roller 25.

Figure 5:
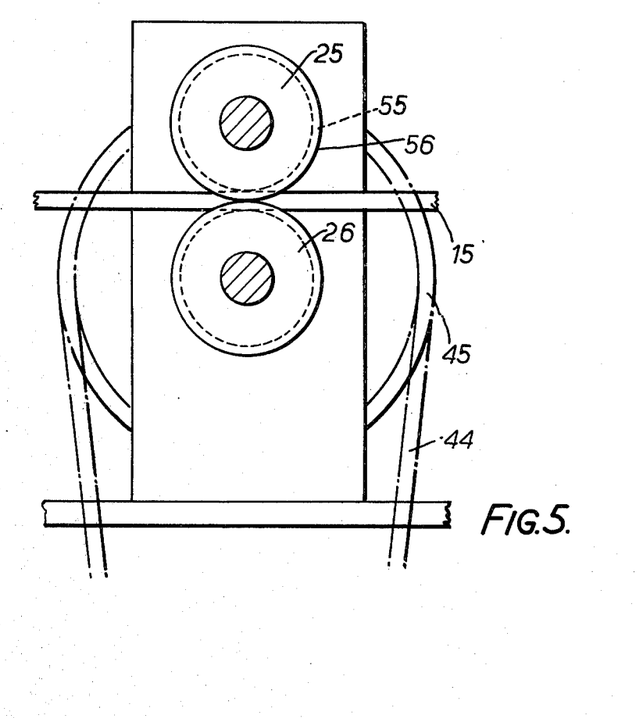
FIG. 5 is a side elevation of the rear rollers.

The rollers 25 and 26 have fifteen round annular opposed grooves 55 in their surfaces of diameters such as to accomodate without friction the passage of the sheath on the rod between the rollers. The grooves are separated by knurled surfaces 56 and the rollers are spaced apart so that the surfaces 56 do not touch but are spaced apart less than two thicknesses of the sheath fabric so that the double thickness web of fabric between the tubes of the sheath is engaged by the knurled surfaces but not cut by them.

The sprocket wheel 51 drives the front rollers 12 and 13 via a similar wheel 60 and a chain 61. The lower roller 12 is keyed to a shaft 63 which at its other end carries a cog 64 which engages another cog 65 on a shaft 66 to which the front upper roller 13 is keyed.

Figure 3:
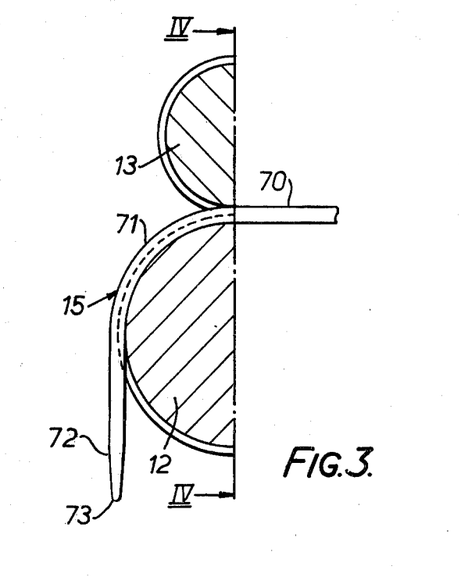
FIG. 3 is a side elevation in partial cross section of the entry end of the machine showing the way in which the forming rods are shaped and are held in place by the front rollers.
Figure 4:
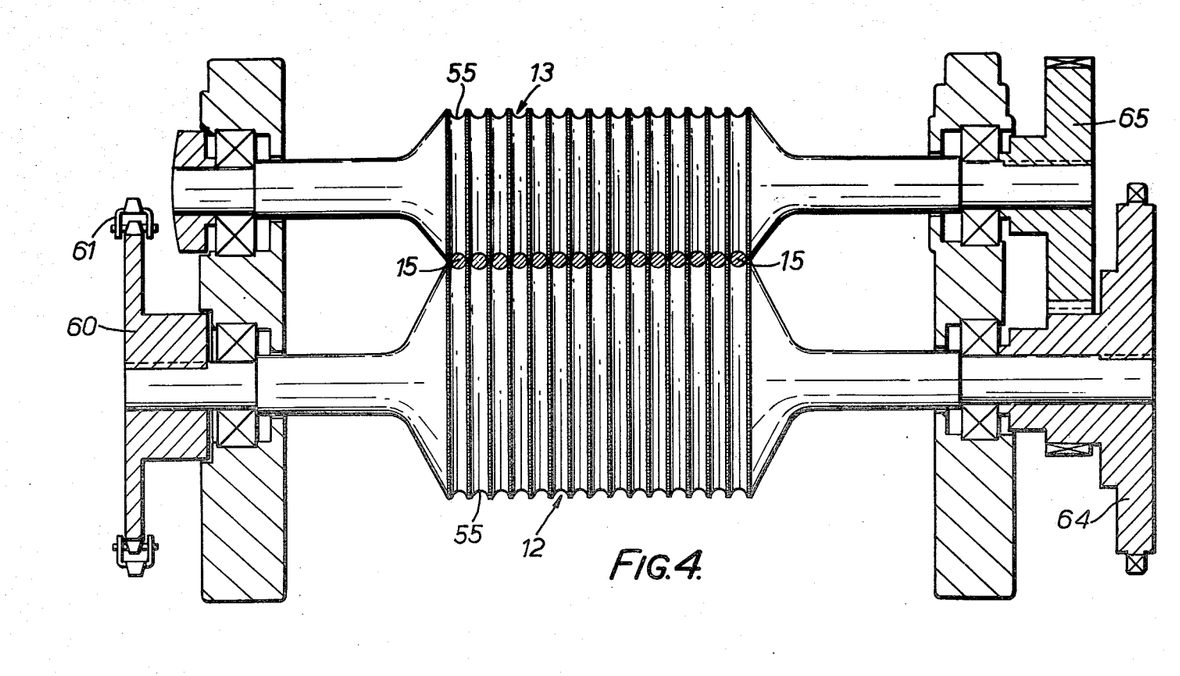
FIG. 4 is a partial sectional transverse view of the front rollers on the line IV—IV of FIG. 3.

The front rollers have the same opposed grooves 55 and knurled surfaces 56. The function of these rollers is to prevent the forming rods 15 being drawn through the machine.

These rods have a walking stick type of shape being straight for most of their length, their sizing section, 70, and bending around a quadrant 71 at one end and then extending for less than 1 quadrants length, their tube opening section, 72, at right angles to their section 70.

The tube opening portion has a taper on it tapering for example from 0.25 inches diameter at end 73 to 0.260 inches at the start of the quadrant and finally reaching 0.270 inches diameter at the start of the sizing section 20 which is about ¼ to ½ of a quadrants length from the end of the quadrant 71.

The machine is run at a linear speed such that the cold stressed tube as it is brought onto the sizing section 70 is heated to at least 20° C. above the softening temperature of the impregnating resin when a thermoplastic resin is used, or above the deformation temperature when a deformable composite material is used and is held at a temperature above its softening or deformation temperature for at least 15 secs. It is then force cooled to a temperature at least 20° C. and desirably at least 60° C. below the softening or deformation temperature before being conveyed off the rods 15 and cut to length.

Clearly the heating and cooling regime must be such as to enable the stresses imparted to the fabric on it being drawn onto the rods 15 to be relaxed so that an undistorted multitubular sheath is produced and the particular temperature and time regime can readily be selected by simple experiment for any pairs of fabric and impregnating thermoplastic polymer, or deformable composite materials. Examples of specific materials which can be used in the machine are given below.

The rods 15 are made of spring steel to comply with British Standard Specification EN49. The section 72 is preferably 0.7×a quadrant length long, and sizing section 70 of the rod is about 90 quadrants long and is 0.270 inches in diameter.

One satisfactory set of conditions is to use the impregnated fabric described below in Example 1 with a quadrant length of 8 cms at a line speed of 250 quadrants (2 meters) per minute passing it through a heating zone 62.5 quadrants (500 cms) long to which air heated to 120° C. is supplied and then allow it to travel through a cooling zone 31.25 quadrants long (250 cms) where it is cooled with a forced air draft of ambient air. This procedure results in straight essentially strain free sheaths.

In a preferred modification as shown in FIGS. 1 and 2 floating mandrels 80 are located in the fabric prior to the fabric reaching the inlet end 73 of the rods 15. If desired heating means e.g. air blowers may be located just below the floating mandrels so as to enable the fabric to be preheated.

When this arrangements is used cool air blowers or other cooling means are preferably disposed opposite the floating mandrels, the tube opening section 72 of the rods and quadrant 71 of the rods or opposite any one or more of these. The mandrels are all the same length namely 3 quadrants (25 cms) and have diameters of 0.230 inches i.e. 85% of the diameter of the sizing section 70 of the rods 15. More broadly the diameter of the floating mandrels are in the range 75% to 95% of the diameter of the sizing section of the rods.

When the fabric is heated before it passes onto the floating mandrels, it is possible to cool the same as it passes over the floating mandrels and onto the rods so that the temperature of the fabric has dropped to within not more than 20° C. above ambient temperature before it reaches the sizing portions of the main rods.

These mandrels are held in position merely by the frictional force of the fabric passing over their surfaces there being one floating mandrel to each tube. The floating mandrels may have concave ends to facilitate them registering with the ends 73 of the rods 15.

The floating mandrels and rods, e.g. at least on the portions 72 and 71, may, if desired, be given a friction reducing and abrasion resistant surface finish, e.g. they may be chromium plated.

Figure 6:
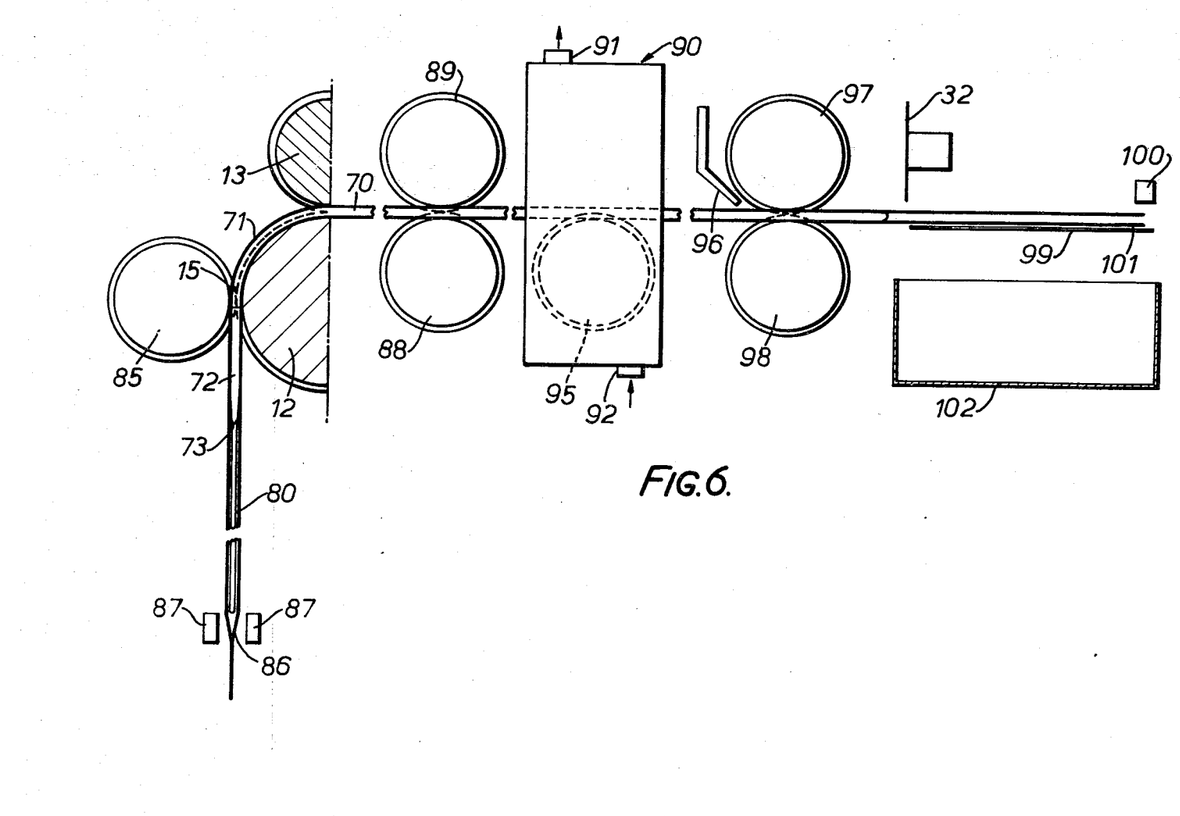
FIG. 6 is a diagrammatic side elevation of a modifiedb form of machine in accordance with the invention.

Referring now to FIG. 6 this shows a preferred arrangement of the machine, an additional inlet drive roller 85 similar in shape to roller 13 and provided with the same drive is disposed on the horizontal axis of the roller 12 and in driving relationship with it.

Just below the floating mandrels 80, which have a length about four times the diameter of the roller 85, an inlet slot 86 is provided by two parallel bars 87.

The rods 15 extend from the rollers 12 and 13 between an optional extra pair of drive rollers 88 and 89 through a closed circulation force air draft heating chamber 90, the outlet 91 of which is connected with the inlet 92 via a fan (not shown) and heating means (not shown). Located within the heating chamber 90 are one or more, preferably three, rod support rollers 95, which prevent the rods 15 bending downwards. If desired these could provide additional drive on the underface of the fabric by being replaced by rubber surfaced profiled rollers or rubber covered V-shaped groove rollers.

The rods then extend out to cooling means, here a fishtail 96 extending across the width of the rods and provided with air under pressure, the aim being to rapidly reduce the temperature of the fabric and the resin.

The rods then passes through rear drive rollers 97 and 98 and then are discontinued or terminate. The fabric then passes off the rods over a moveable table 99 and under a photoelectric cell 100 which, when it senses the end 101 of the sheath, causes the circular saw 32 to cut the length of sheath from the remainder. As soon as this occurs the table 99 swings down depositing the sheath cut to length in a collecting receptacle 102. The position of the cell 100 is adjustable so as to enable sheaths of different length to be 16 automatically cut.

In an alternative arrangement (not shown) the fishtail 96 is replaced by a shroud enclosing the rollers 97 and 98.

EXAMPLE 1

A woven tubular fabric of 1.2 denier polyester fibres, which have a melting point of 150° C. in air and which has a warp thread count of 96 ends per inch, a weft thread count of 82 picks per inch, an air permeability of 3.21 liters/min/sq. cm/cm, pressure drop, weighs 0.03 grams per sq. cm., and is 0.7 mms thick. The tubes when flat are 14 mms wide and the integrally woven webs between tubes are 1 mm. wide.

This fabric is impregnated with 0.0045 to 0.009 grams/sq. cm. of a thermoplastic polymer resistant to the lead acid battery operating environment and melting at a temperature below and preferably at least 30° C. below that of the threads of the fabric. We prefer to use 0.006 grams/sq. cm. of polymer having a melting point of 80° C. The fabric after impregnation has an air permeability of 3.18 liters/min./sq. cm./cm. pressure drop.

EXAMPLE 2

In this example a non woven web of 2" to 3" long 3 denier polyester fibres is used. The web weighs 70 grams per square meter and in this condition will be referred to as web 1. When web 1 is impregnated with 70 grams per square meter of a polyacrylic binder (Breon 2761), in this condition it will be referred to as web 2, it has the following shrinkage properties: when heated on a flat support to 195° C. it shrinks by 5-10% in both the machine length and machine width directions.

Web 2 is impregnated as a flat sheet with 0.0045-0.009 grams/sq. cm. (20% by weight) of a polyacrylic resin (a polyacrylamide) supplied by Rohm GmbH as PLEX 4847D. The impregnated web is then dried and cured at 160° C. in flat sheet form and is then calendered to ensure it is flat to produce web 3. Two layers of web 3 are superimposed and single parallel lines of stitching are formed to define contiguous pockets, e.g. 15, side by side. The material is formed into a multitubular sheath on the machine described above with reference to FIG. 6 of the drawings by feeding the ends of the flat pockets over the floating mandrels and onto the ends 72 of the hooked rods 15. The material is fed over the rods at 3 meters per minute and the temperature in the heating chamber 90 of the machine is 160° C. to 180° C., and the material is exposed to this temperature for 5 to 10 seconds.

EXAMPLE 3

Web 2 is impregnated as a flat sheet with 0.0045-0.009 grams/sq. cm. of thermosetting phenol formaldehyde resin supplied by BXL Ltd.

The impregnated web is then dried and cured at 160° C. in flat sheet form and is then calendered to ensure it is flat to produce web 4.

Multitubular sheaths are then made from this web 4 in the same manner as described for Example 2.

EXAMPLE 4

Web 1 is impregnated as a flat sheet with 70 grams/sq. meter of a polyacrylic resin (a polymethylmethacrylate) supplied by Rohm GmbH as PLEX 4847D. The impregnated web is then dried and cured at 160° C. in flat sheet form and calendered to ensure it is flat to produce web 5.

Multitubular sheaths are then made from this web 5 in the same manner as described for Example 2.

PLEX 4857D, when cast as a thin void free film by evaporation at a temperature above 40° C., has a tensile strength on the tensile test of DIN 53455 of 35 N/mm$^2$ at a pulling speed of 100 mm per minute, and an elongation at break $\epsilon R$ of about 4%.

The material on the torsion pendulum test of DIN 53455 has a T$\Delta$ maximum at a frequency of 1 hour of about +55° C.

The material is further characterised by having a density of 1.06 grams/cc.; it has an actual viscosity at 20% (Brookfield viscometer #6) of 500 to 4000 PAS.

The average particle size as a 50% aqueos suspension is 0.15 micromicrons. The suspension has a pH of 7±0.2 and the minimum film forming temperature is about 40° C.

Where tubular batteries are to be used in relatively high ambient temperatures such as in the tropics, the nonwoven fabrics preferred for use in temperate climates may lack dimensional stability and long term strength sufficient to accomodate the stressing which occurs in use caused by the changes in volume which the active material undergoes during cycling.

For such uses we prefer to use a composite sheath having a strength imparting outer layer and an inner layer to retain the active material within the sheath. The outer layer may comprise a woven fabric of electrolyte and active material resistant polymer, e.g. a polyester fibre, preferably a continuous filament woven fabric.

The inner layer may comprise a nonwoven electrolyte and active material resistant material e.g. of staple polyester fibres or woven or nonwoven glass fibre.

The inner layer may be an air laid or carded needle punched nonwoven fabric made from staple fibres or could be a wet laid water leaf type of fabric or could be either of these types which have been made from the thermoplastic fibres and in which the final sheet has been heated or pressed and heated so as to bond at least a proportion of the fibres to each other while retaining porosity in the sheet.

The outer layer may be stiffened with any of the polymer systems mentioned above and while we prefer a woven fabric for high temperature uses a nonwoven fabric could be used as the outer layer in less demanding environments.

The inner layer may be attached to the outer layer merely by the stitching defining the tubes or could additionally be attached between the tube defining lines with spaced apart areas dots or lines of adhesive.

Where both the inner and outer layers are composed of thermoplastic materials they may be adhered by welding e.g. along the lines defining the tubes or elsewhere.

Where the inner layer is a nonwoven fabric it could be attached to a woven or nonwoven outer fabric by being needled through it.

The inner layer is preferably less dense than the fabrics described above for use as single layer sheaths, e.g. it may weight less than 50, e.g. 5 to 30 grams per square meter.

The outer layer could also consist of a porous or perforated polymer film or sheet, e.g. of polyvinyl chloride or polyolefin or other electrolyte and active material resistant polymer. Two layers of material suitable for use as the inner layer could be sandwiched between two layers of such sheet or film and the layers attached along the lines defining the tubes e.g. by stitching or welding or glueing.

The material could then be preheated as appropriate and lead over the floating mandrels and around the bend with heating being continued as necessary.

Obviously numerous modifications and variations of the present invention are possible in light of the above teachings. It is therefore to be undersrtood that within the scope of the appended claims, the invention may be practices otherwise than as specifically described herein.

What we claim as our invention and desire to secure by letters patent is:

1. A method of making a multitubular sheath having at least five tubes comprising:

providing a porous multitubular heated fabric impregnated with 15% to 35% by weight of polymer, the polymer of the composite being a thermoplastic polymer having a melting point at least 20° C. below the temperature at which the material of the fabric melts or chars;

continuously feeding the heated fabric onto an array of parallel metal rods, one of said at least five tubes to each rod, the rods having curved inlet portions and straight sizing portions, while holding the rods in a fixed position, the rods having substantially the same cross sectional area over the whole of their length;

floatingly registering a mandrel in each of said at least five tubes such that each mandrel abuttingly engages the inlet end of its associated rod so as to assist the continuous feeding of the fabric onto the rods, cooling the heated fabric as it is continuously fed onto said rods so that the fabric at least immediately prior to the sizing portions is substantially at ambient temperature heating the fabric on the straight sizing portions so as to permit the fabric to conform to the rod;

thereafter cooling the fabric on the rods to a temperature so as to permit the thermoplastic polymer to solidify and the tubes to become self supporting and feeding the fabric off the ends of the rods; and, cutting it to the required length.

2. A method as claimed in claim 1 in which each floatingly registered mandrel is a straight rod 10 to 50% of the length of a main rod of the rods.

3. A method as claimed in claim 1 in which the cross section of each floatingly registered mandrel is 80% to 95% of the cross section of the sizing portion of a main rod of the rods.

4. A method of making a multitubular sheath having at least five tubes comprising:

providing a porous multitubular heated fabric impregnated with 15% to 35% by weight of polymer, the composite material being deformable at a temperature at least 20° C. below the temperature at which the material of the fabric melts or chars;

continuously feeding the heated fabric onto an array of parallel metal rods, one of said at least five tubes to each rod, the rods having curved inlet portions and straight sizing portions, while holding the rods in a fixed position, the rods having substantially the same cross sectional area over the whole of their length;

floatingly registering a mandrel in each of said at least five tubes such that each floating mandrel abuttingly engages the inlert end of its associated rod so as to assist the continuous feed of the fabric onto the rods, cooling the heated fabric as it is continuously fed onto said rod, so that the fabric at least immediately prior to the sizing portions is substantially at ambient temperature;

heating the fabric on the sizing portions so as to permit the fabric to conform to the rod;

thereafter cooling the fabric on the rods to a temperature so as to permit the deformable composite material to set to shape and the tubes to become self supporting and feeding the fabric off the ends of the rods; and, cutting it to the required length.

5. A method as claimed in claim 4 in which each floatingly registered mandrel is a straight rod 10 to 50% of the length of a main rod of the rods.

6. A method as claimed in claim 4 in which the cross section of each floatingly registered mandrel is 80% to 95% of the cross section of the sizing portion of a main rod of the rods.

* * * * *